US008645750B2

(12) United States Patent
Kaneko et al.

(10) Patent No.: US 8,645,750 B2
(45) Date of Patent: Feb. 4, 2014

(54) COMPUTER SYSTEM AND CONTROL METHOD FOR ALLOCATION OF LOGICAL RESOURCES TO VIRTUAL STORAGE AREAS

(75) Inventors: Satoshi Kaneko, Yokohama (JP); Yukinori Sakashita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 386 days.

(21) Appl. No.: 12/811,914

(22) PCT Filed: Mar. 4, 2010

(86) PCT No.: PCT/JP2010/001526
§ 371 (c)(1),
(2), (4) Date: Jul. 7, 2010

(87) PCT Pub. No.: WO2011/108027
PCT Pub. Date: Sep. 9, 2011

(65) Prior Publication Data
US 2011/0219271 A1    Sep. 8, 2011

(51) Int. Cl.
    *G06F 11/00*    (2006.01)
(52) U.S. Cl.
    USPC ............................................. 714/6.2; 714/6.1
(58) Field of Classification Search
    None
    See application file for complete search history.

(56) References Cited

U.S. PATENT DOCUMENTS

| 6,032,224 A * | 2/2000 | Blumenau ............... 711/117 |
| 8,171,245 B2 * | 5/2012 | Maruyama et al. ......... 711/161 |
| 2006/0277386 A1 | 12/2006 | Eguchi |
| 2007/0192560 A1 * | 8/2007 | Furuhashi ............... 711/170 |
| 2008/0104343 A1 | 5/2008 | Miyagaki et al. |
| 2009/0043982 A1 | 2/2009 | Kano et al. |
| 2009/0292870 A1 | 11/2009 | Sambe et al. |
| 2009/0300285 A1 | 12/2009 | Nagai et al. |
| 2012/0011315 A1 * | 1/2012 | Ishizaki et al. ........... 711/114 |

FOREIGN PATENT DOCUMENTS

| EP | 1596303 A2 * | 11/2005 | ............ G06F 11/20 |
| JP | 2003-15915 A | 1/2003 | |
| JP | 2006-338341 A | 12/2006 | |
| JP | 2007-66259 A | 3/2007 | |
| JP | 2008-112291 A | 5/2008 | |
| JP | 2009-282800 A | 12/2009 | |

* cited by examiner

Primary Examiner — Michael Maskulinski
(74) Attorney, Agent, or Firm — Mattingly & Malur, PC

(57) ABSTRACT

A computer system functions to dynamically assign the storage capacity to the host computer. If an event such as a failure occurs in the logical resources, the performance requirements of the virtual volumes must be guaranteed to the host computer.
Accordingly, the computer system comprising a storage apparatus, wherein the storage apparatus detects the occurrence of an event in the logical resources, compares the performance of the logical resources where the event occurred with the performance of the virtual volumes and, in accordance with the result of the comparison, sets the correspondence relationship of the virtual volumes to the logical resources.

13 Claims, 21 Drawing Sheets

FIG.7

| STORAGE ID | LOGICAL RESOURCE ID | ASSIGN-MENT POOL ID | CAPA-CITY (GB) | PAGE ID | STARTING ADDRESS | ENDING ADDRESS | USAGE STATUS | AVERAGE ACCESS INTERVAL (MIN) | STATUS |
|---|---|---|---|---|---|---|---|---|---|
| 00 | 0 | 1 | 500 | 0 | 0 | 999 | ASSIGNED | 1.0 | NORMAL |
| | | | | 1 | 1000 | 1999 | ASSIGNED | 10.0 | NORMAL |
| | | | | 2 | 2000 | 2999 | UNASSIGNED | Null | NORMAL |
| | 1 | 2 | 1000 | 3 | 0 | 999 | ASSIGNED | 1.0 | RECOVERING FROM FAILURE |
| | | | | 4 | 1000 | 1999 | UNASSIGNED | Null | RECOVERING FROM FAILURE |
| | | | | 5 | 2000 | 2999 | UNASSIGNED | 15.0 | RECOVERING FROM FAILURE |

| STORAGE ID | LUN | POOL ID | ADDRESS AREA | ASSIGNED LOGICAL RESOURCE ID | ASSIGNED LOGICAL RESOURCE PAGE ID |
|---|---|---|---|---|---|
| 00 | 1 | 1 | 0~999 | 0 | 1 |
| | | | 1000~1999 | 1 | 0 |
| | | | 2000~1999 | NULL | NULL |

| LOGICAL RESOURCE ID (900) | I/O PERFORMANCE (902) | RELIABILITY (904) |
|---|---|---|
| 0 | 1000 | HIGH |
| 1 | 800 | HIGH |
| 2 | 600 | LOW |

FIG.11

| EVENT ID (1000) | TIME OF OCCUR-RENCE (1002) | LOGICAL RESOURCE ID (1004) | EVENT TYPE (1006) | IMPACTED PARAMETER (1008) | ESTIMATED TIME OF RECOVERY (1010) |
|---|---|---|---|---|---|
| 1 | 09/09/09 20:00 | 0 | PERFORMANCE DETERIORATION DUE TO DEGENERATE MODE | I/O PERFOR-MANCE, RELIABILITY | 09/09/09 23:30 |
| 2 | 09/09/09 23:00 | 0 | FAILURE RECOVERY | I/O PERFOR-MANCE, RELIABILITY | null |
| 3 | 09/09/09 20:00 | 2 | SUSPEND DUE TO FAILURE | I/O PERFOR-MANCE, RELIABILITY | NOT DETERMINED YET |

FIG. 23

| STORAGE ID | LOGICAL RESOURCE ID | ASSIGNMENT POOL ID | STORAGE LUN | CAPACITY (GB) | PAGE ID | STARTING ADDRESS | ENDING ADDRESS | USAGE STATUS | AVERAGE ACCESS INTERVAL (MIN) | STATUS |
|---|---|---|---|---|---|---|---|---|---|---|
| Null | 0 | 1 | Null | 500 | 0 | 0 | 999 | ASSIGNED | 1.0 | NORMAL |
| | | | | | 1 | 1000 | 1999 | ASSIGNED | 10.0 | NORMAL |
| | | | | | 2 | 2000 | 2999 | UN-ASSIGNED | Null | NORMAL |
| 00 | 1 | 2 | 0 | 1000 | 3 | 0 | 999 | ASSIGNED | 1.0 | RECOVERING FROM FAILURE |
| | | | | | 4 | 1000 | 1999 | UN-ASSIGNED | Null | RECOVERING FROM FAILURE |
| | | | | | 5 | 2000 | 2999 | UN-ASSIGNED | 15.0 | RECOVERING FROM FAILURE |

FIG.24

| POOL ID | LOGICAL RESOURCE ID |
|---|---|
| 1 | 0 |
|   | 1 |
|   | 2 |

FIG.25

| STORAGE ID | LUN | POOL ID | ADDRESS AREA | ASSIGNED LOGICAL RESOURCE ID | ASSIGNED LOGICAL RESOURCE PAGE ID |
|---|---|---|---|---|---|
| Null | 1 | 1 | 0 ~ 999 | 0 | 1 |
|   |   |   | 1000 ~ 1999 | 1 | 0 |
|   |   |   | 2000 ~ 2999 | NULL | NULL |

COMPUTER SYSTEM AND CONTROL METHOD FOR ALLOCATION OF LOGICAL RESOURCES TO VIRTUAL STORAGE AREAS

TECHNICAL FIELD

This invention relates to a computer system, specifically to a computer system comprising a function of dynamically assigning a storage capacity to a host computer and a control method of the same.

BACKGROUND ART

Conventionally, a computer system providing a large-scale data storage service to a host computer exists. This system is known to comprise a storage apparatus to which the host computer is connected and a management apparatus of the storage apparatus.

The storage apparatus manages multiple hard disks by the RAID (Redundant Array of Independent/Inexpensive Disks) method. Then, [the storage apparatus] logicalizes physical storage areas of a large number of hard disks and provides the logicalized resources to the host computer as logical volumes. The host computer accesses the logical volumes to request the reading and writing of data.

One type of this kind of logicalization technology is known as Thin Provisioning. In this logicalization technology, the storage apparatus sets volumes in which the storage capacity is virtualized for the host computer. In accordance with the host computer's write access to the virtual volumes, the storage apparatus sequentially assigns real storage areas to the virtual volumes.

Therefore, this technology is effective compared with the method of assigning a large amount of storage areas in the logical volumes from the beginning in that the storage resources can be utilized efficiently. This technology is described in Japanese Patent Application ANo. 2003-015915A and Japanese Patent Application No. 2006-338341A.

The method for providing storage areas to virtual volumes is achieved by assembling multiple logical resources to which real storage areas are assigned respectively into volumes called pools and assigning the pools to the virtual volumes.

If the host computer makes a write access to the virtual volumes, the storage apparatus assigns a certain size of storage areas from the logical resources in the pool to the virtual volumes. By this method, the storage apparatus can save write data from the host computer.

Japanese Patent Application No. 2007-66259A discloses that, for the purpose of preventing the storage capacity distributed to the logical volumes from the magnetic disks which are inappropriate compared with the use of the virtual volumes as a result of automatic expansion of the virtual volume capacity by Thin Provisioning, that is, for ensuring that storage areas are not assigned from low-speed, low-quality magnetic disks to the virtual volumes enabling high-speed access for the host computer, when the storage system automatically expands the virtual volume capacity, storage areas are added to the volumes from the magnetic disks matching the characteristics of the volumes.

CITATION LIST

Patent Literature

PTL 1: Japanese Patent Application No. 2003-015915
PTL 2: Japanese Patent Application No. 2006-338341A
PTL 3: Japanese Patent Application No. 2007-66259A

SUMMARY OF INVENTION

Technical Problem

If an event such as a failure occurs in a storage device which provides logical resources to the virtual volumes, the performance of data write to the logical resources and data read from the logical resources; that is, the JO performance of the logical resources is deteriorated, which causes problems such as the deterioration of the reliability of the read and write processing.

As a result, there is a problem that specific performance requirements regarding the JO performance and the reliability of the virtual volumes which the storage apparatus guaranteed to the host computer cannot be satisfied.

Therefore, an object of this invention is to provide a computer system which, in the computer system comprising the function of dynamically assigning the storage capacity to the host computer, even if an event such as a failure occurs in the logical resources, can maintain the performance requirements of the virtual volumes guaranteed to the host computer.

Solution to Problem

This invention is characterized by the computer system comprising a storage apparatus for achieving this purpose, wherein the storage apparatus detects the occurrence of an event in the logical resources, compares the performance of the logical resources where the event occurred with the performance of the virtual volumes and, in accordance with the result of the comparison, sets the correspondence relationship of the virtual volumes to the logical resources.

Advantageous Effects of Invention

According to this invention, in the computer system comprising the function of dynamically assigning the storage capacity to the host computer, a computer system which, even if an event such as a failure occurs in the logical resources, can maintain the performance requirements of the virtual volumes guaranteed to the host computer and the control method of the same can be provided.

BRIEF DESCRIPTION OF DRAWINGS

FIG. 7 is a logical resource management table.
FIG. 9 is a virtual volume configuration table.
FIG. 10 is a logical resource performance table.
FIG. 11 is a logical resource event table.

FIG. 23 is a logical resource management table which manages the correspondence relationship of storage areas in the host computer of the computer system in FIG. 21.

FIG. 24 is a pool management table in the host computer.

FIG. 25 is a virtual volume configuration table in the host computer.

DESCRIPTION OF EMBODIMENTS

Figure 1:
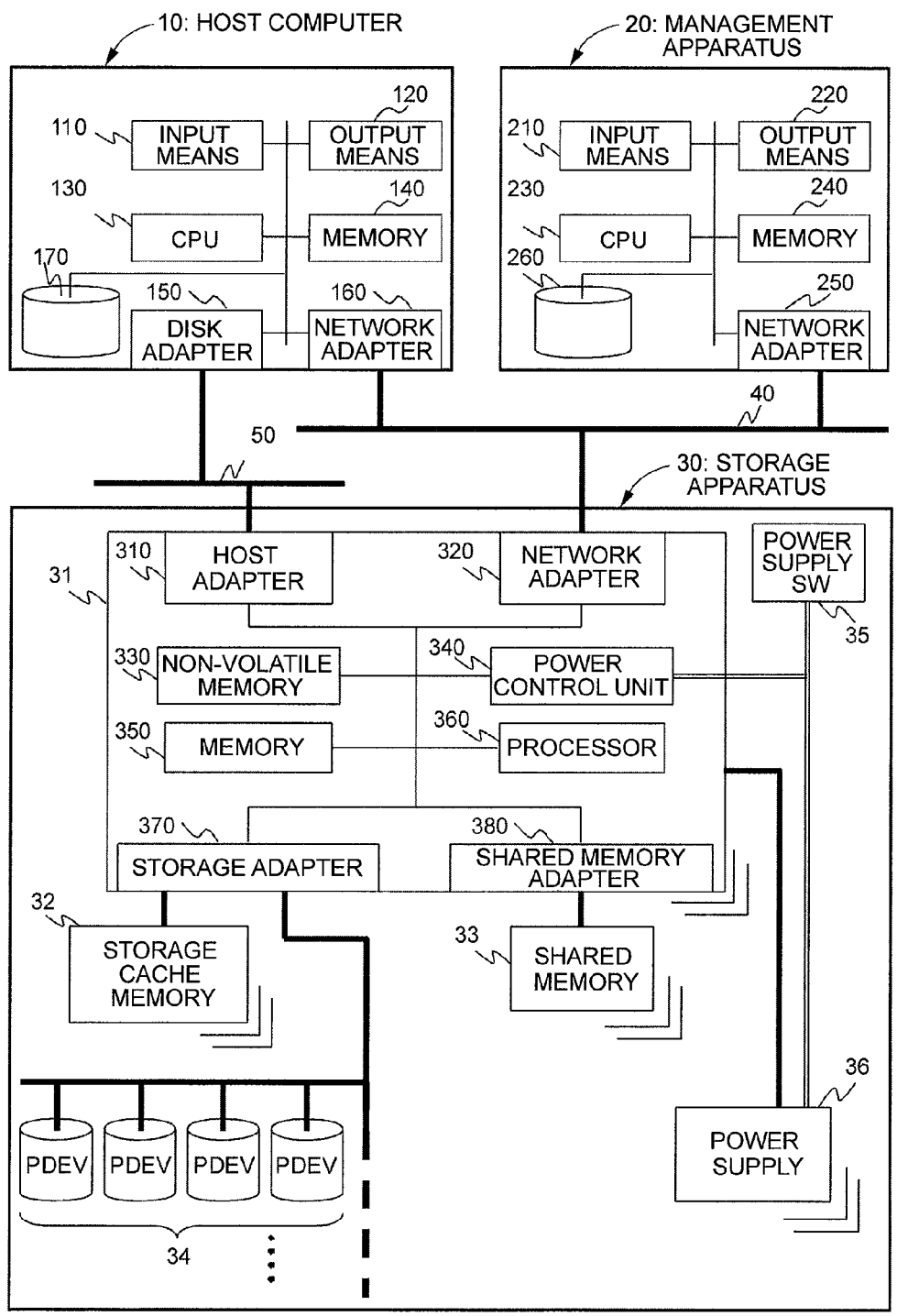
FIG. 1 is a hardware block diagram showing an example of the embodiment of the computer system according to this invention.

Next, the embodiments of this invention are described below. FIG. 1 is a hardware block diagram showing an example of the embodiment of the computer system according to this invention. The computer system comprises a storage apparatus 30, to which a host computer 10 and a management apparatus 20 are connected.

Though the computer system at least comprises a storage apparatus, what comprises the host computer 10 and/or the management apparatus 20 may also be defined as a computer system. The storage apparatus 30 is also referred to as a storage system or a storage subsystem.

Though this embodiment defines the storage apparatus 30 as comprising control resources and storage resources, the storage resources may also be separated from the storage apparatus. The storage apparatus 30 performs the control processing required for storing data in the storage areas in the storage devices 34. The reference sign 31, as described later, indicates the control device (controller) as a control resource.

The host computer 10 accesses the logical storage areas of the storage apparatus 30. The logical storage configuration between the host computer 10 and the storage apparatus 30 is described later. The host computer 10 comprises an input means 110, an output means 120, a CPU 130, a memory 140, a disk adapter 150, a network adapter 160, and a disk drive 170.

The input means 110 is means for accepting the input from the administrator and others that operate the host computer 10. The input means 110 is, for example, a keyboard. The output means 120 is means for displaying the status and the setting items of the host computer 10. The output means 120 is, for example, a display device.

The CPU 130 reads the programs stored on the disk drive 170 to the memory 140 and performs the processing specified by the programs. The memory 140 is, for example, configured of RAM or the like and stores programs, data, and others.

The disk adapter 150 is connected to the storage apparatus 30 via a storage network 50 and transmits and receives data to and from the storage apparatus 30. The storage network 50 is configured of protocols suitable for data transfer (e.g. Fibre Channel).

The network adapter 160 is connected to a management network 40, and the host computer 10 performs data transmission and reception to and from the management apparatus 20 and the storage apparatus 30 via the management network 40. The management network 40 is configured of, for example, Ethernet (registered trademark).

The disk drive 170 is, for example, configured of a hard disk device and stores data and programs.

The management apparatus 20 manages the configuration of the storage apparatus 30. The management apparatus 20 comprises an input means 210, an output means 220, a CPU 230, a memory 240, a network adapter 250, and a disk drive 260.

The input means 210 is means for accepting the input from the administrator and others that operate the management apparatus 20. The input means 210 is, for example, configured of a keyboard. The output means 220 is means for displaying the status and the setting items of the management apparatus 20. The output means 220 is, for example, configured of a display device.

The CPU 230 reads various types of management programs stored on the disk drive 260, which are described later, to the memory 240 and, in accordance with the programs, performs the management processing for the storage apparatus. The memory 240 is, for example, configured of RAM and others and stores programs, data, and others.

The network adapter 250 performs data transmission and reception to and from the host computer 10 or the storage apparatus 30 via the management network 40.

The disk drive 260 is, for example, configured of a hard disk device and stores data and programs.

The storage apparatus 30 comprises a controller 31, a storage cache memory 32, a shared memory 33, physical devices (PDEVs) 34, a power-supply switch 35, and a power supply 36.

The controller 31 controls the storage of data into the storage areas of the PDEVs 34. The storage cache memory 32 temporarily stores the data read from and written into the PDEVs 34. The shared memory 33 stores the configuration information of the controller 31 and the PDEVs 34. The PDEVs 34 are configured of multiple disk devices.

The power supply 36 supplies power to the respective parts of the storage apparatus 30. The power-supply switch 35 is a switch by which the supply of power from the power supply 36 is turned ON/OFF.

The disk devices (storage devices) are, for example, configured of hard disk drives, and mainly stores user data. As a storage device, a drive configured of a semiconductor memory such as a flash memory may also be used.

The controller 31 is configured of a host adapter 310, a network adapter 320, a non-volatile memory 330, a power control unit 340, a memory 350, a processor 360, a storage adapter 370, and a shared memory adapter 380.

The host adapter 310 transmits and receives data to and from the host computer 10 via the storage network 50. The network adapter 320 performs data transmission and reception to and from the host computer 10 or the management apparatus 20 via the management network 40.

The non-volatile memory 330 is configured of a hard disk or a flash memory, and stores the programs running in the controller 31, configuration information, and others. The power control unit 340 controls power which is supplied from the power supply 36.

The memory 350 is, for example, configured of RAM or the like and stores programs, data, and others. The processor 360 reads the programs stored in the non-volatile memory 330 to the memory 350, and performs the processing specified by the programs.

The storage adapter 370 performs data transmission and reception between the PDEVs 34 and the storage cache memory 32. The shared memory adapter 380 performs data transmission and reception to and from the shared memory 33.

Figure 2:
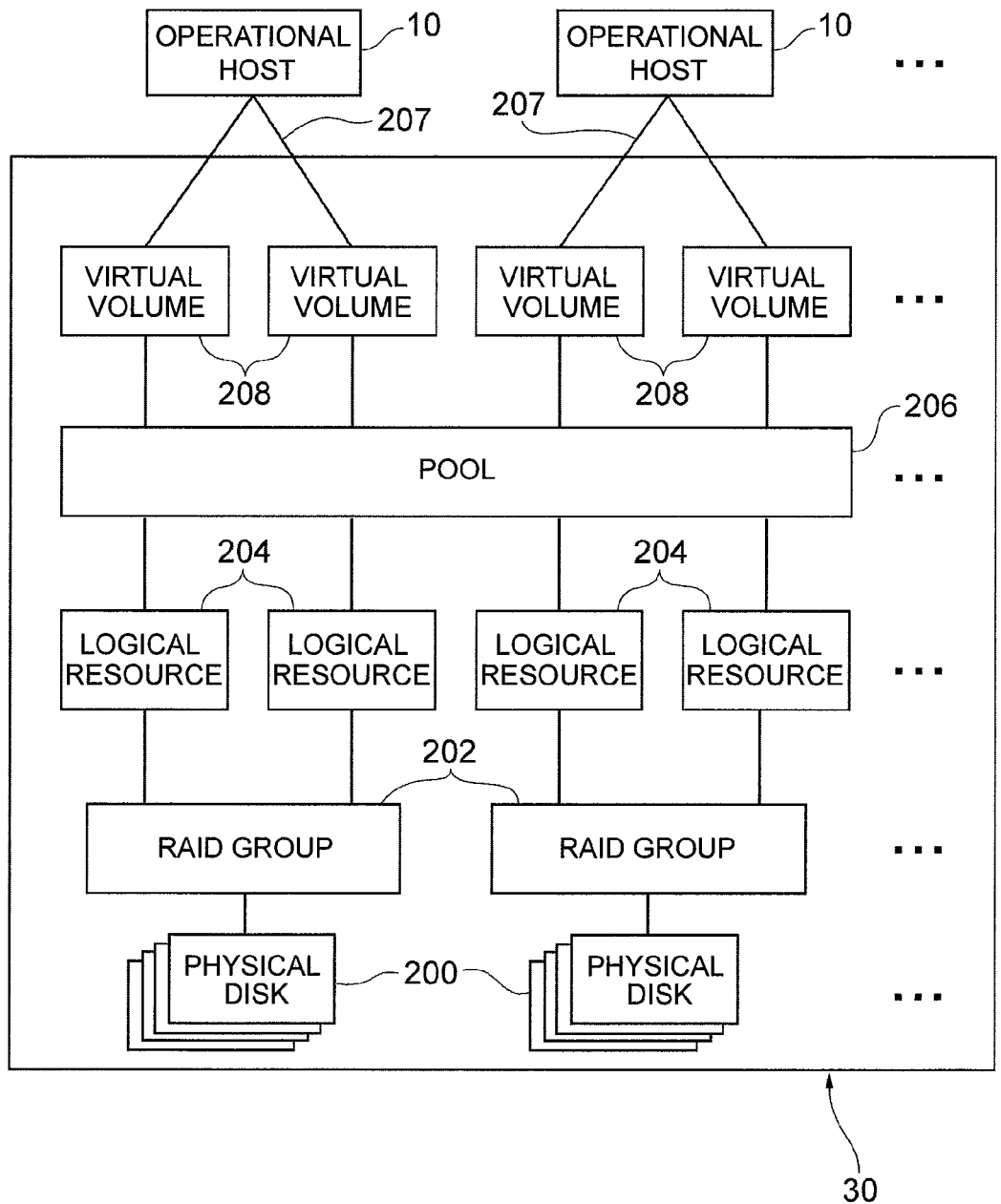
FIG. 2 is a function block diagram showing the logical configuration of storage areas between the host computers and the storage apparatus.

FIG. 2 is a function block diagram showing the logical configuration of storage areas between the host computers 10 and the storage apparatus 30. The storage apparatus 30 creates a RAID group 202 comprising the RAID configuration from the PDEVs 34 configured of multiple physical disks 200. The storage apparatus 30 partitions the RAID group 202 into multiple logical areas. These logical areas are referred to as logical resources or logical volumes, and hereinafter mainly referred to as the logical resources 204.

In FIG. 2, the reference sign 208 has an address but does not have any area for the PDEV 34 that is a virtual volume, whose storage capacity is virtualized. This virtual volume, which is also in the logical configuration, is distinguished from the logical resource 204 in terms of not comprising a real storage area.

The storage apparatus 30, by setting a path 207 from the host computer (operational host) 10 to a virtual volume 208, causes the virtual volume 208 to be accessible to the operational host 10. Note that it is possible to cause the areas of the cache memory 32 correspond to the virtual volumes.

For the host computer 10 to utilize physical storage areas for writing and reading data, it is preferable to associate the logical resources with a pool 206. The pool 206 is a logical group which assembles one or multiple logical resources by a specified attribute, and is preferable for managing the storage areas assigned to the virtual volumes.

Figure 3:
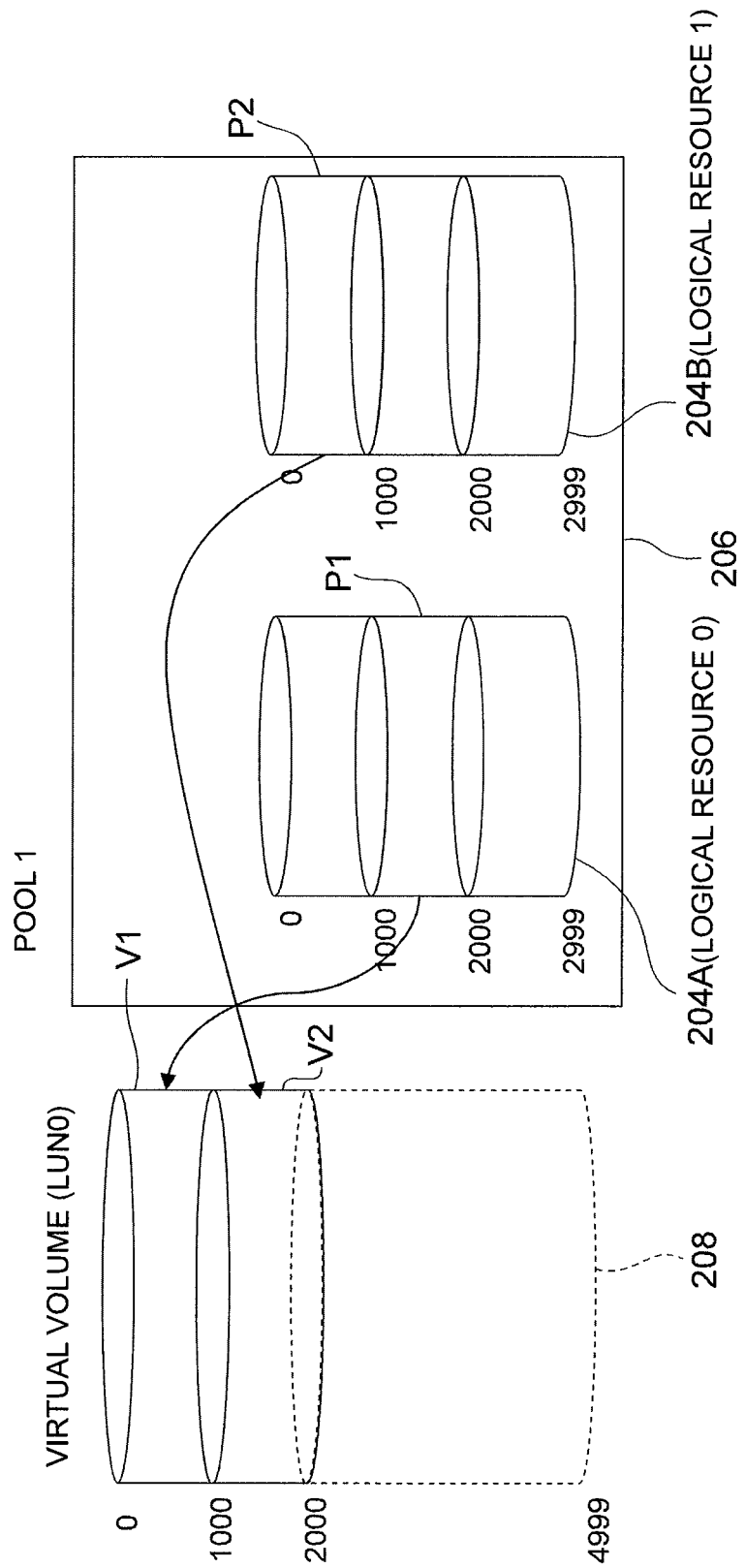
FIG. 3 is a block diagram related to the operation of Thin Provisioning.

FIG. 3 shows a block diagram related to the operation of Thin Provisioning. In a pool 1 (206), a logical resource 0 (204A) and a logical resource 1 (204B) exist.

The storage apparatus 30, if the host computer 10 makes write access to a virtual volume (LUN0), assigns the storage areas in the logical resources to the access area in the virtual volume.

The storage apparatus 30 performs this assignment for each certain capacity referred to a "page." This method, even if the storage capacity of the virtual volume is virtualized, enables the host computer 10 to perform write/read access to the virtual volume.

In FIG. 3, a Page P1 in the logical resource 0 (204A) is assigned to an area V1 in the virtual volume (LUN0) 208, and a Page P2 in the logical resource 0 (204B) is assigned to an area V2 in the virtual volume (LUN0) 208. The storage apparatus 30 manages and controls the virtual volumes, the pool, the configuration of each logical resource, and the mutual correspondence relationship of the above with reference to the management tables.

Figure 4:
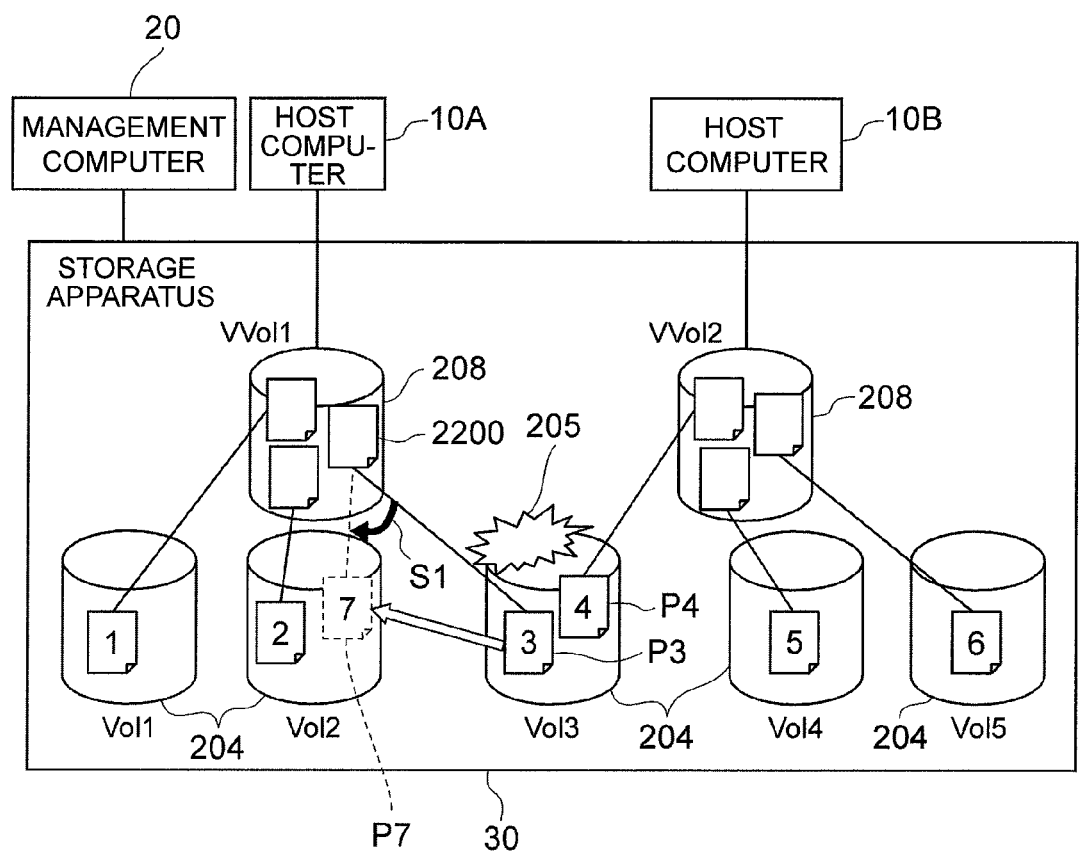
FIG. 4 is a block diagram describing the recovery processing performed by the storage apparatus when an event such as a failure occurs in the logical resources.

The storage apparatus 30, if an event such as a failure occurs in logical resources, compares the performance of these logical resources with the performance of the virtual volumes and, in accordance with the result of the comparison, performs the recovery processing such as changing or setting the correspondence of the virtual volumes to the logical resources. FIG. 4 is a block diagram describing this type of processing of the storage apparatus 30.

Currently, a storage device failure 205 occurred in the logical resource (204) Vol 3, a RAID group configured of multiple storage devices structuring the logical volume Vol 3 changed to the degenerate mode, and an event whose logical resource is in the performance deterioration status is assumed to have occurred. Note that the management programs and the management tables referred to as the description of FIG. 4 are described in detail in FIG. 5 and later. Note that, at this point, though the "performance deterioration status" is described as an event, a failure in the storage device may also be considered to be an event.

Figure 5:
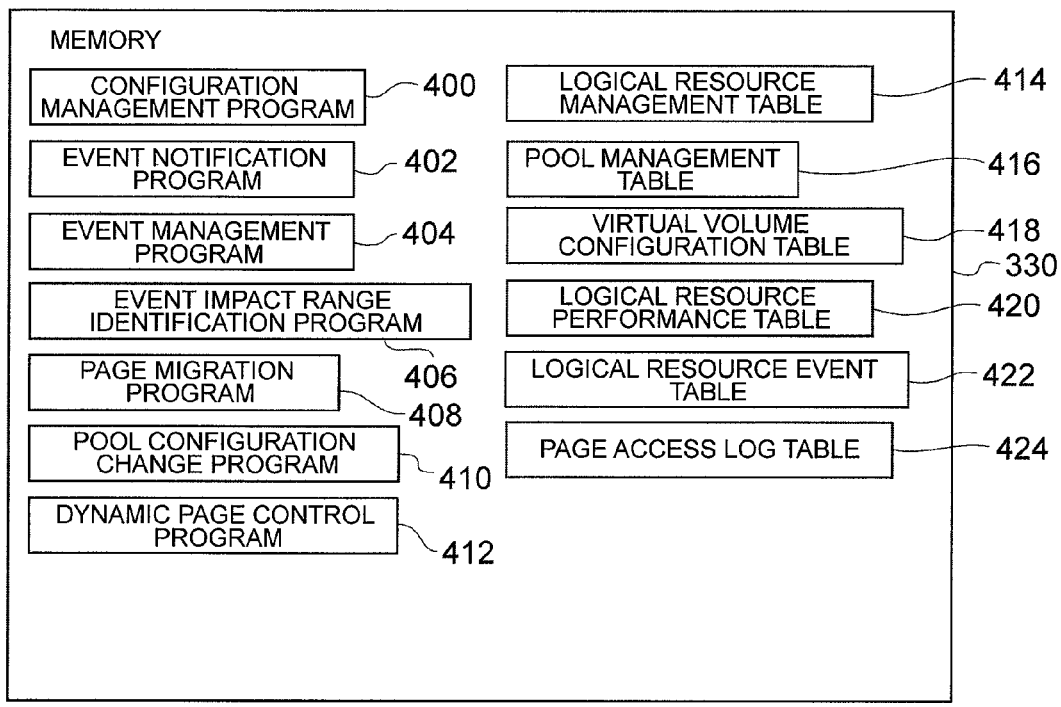
FIG. 5 is a block diagram showing the storage configuration of a memory in the storage apparatus.

The event management program 404 (FIG. 5) in the storage apparatus notifies the occurrence of this event to the event impact range identification program 406 (FIG. 5). The event impact range identification program 406 which received this notification, for identifying the impact which this event makes on the storage control processing, refers to the virtual volume configuration table (FIG. 9). As a result, [the program 406] determines that the virtual volumes (208) VVol 1 and VVol 2 in the correspondence relationship with the logical volume 204 (Vol 3) are within the impact range.

Next, the event impact range identification program 406 refers to the virtual volume requirement table 418 and the logical resource performance table 414, and compares the values of the logical resource I/O performance (the number of I/O processing per unit of time: IO per SECOND) in the deterioration status after the occurrence of the event (800→600) with the required values of the IO performance of the VVol 1 and the VVol 2 (VVol 1: 700, VVol 2: 500).

The page selection program 504, for further identifying the impact range, determines that, even if a Page 4 (P4) in the logical volume Vol 3 is assigned to the virtual volume VVol 2, the required performance of the relevant virtual volume VVol 2 can be maintained, but that, if a Page 3 (P3) in the logical volume Vol 3 is assigned to the virtual volume VVol 1, the required performance of the relevant virtual volume Vol 3 cannot be maintained, and selects the Page 3 (P3) as a migration source page of the data.

Note that a page is a storage area block configured of a certain storage capacity (e.g. 256 KB). The storage apparatus 30 assigns one or multiple pages to a virtual volume for write access to the virtual volume.

Next, the status change management program 504 selects a Page 7 (P7) in the logical volume Vol 2 where no event occurs as a migration destination page, migrates the data from the migration source page to the migration destination page, also releases the Page 3 (P3) from the assignment to an area 2200 in the virtual volume VVOL 1, and assigns the area 2200 in the virtual volume VVOL 1 to the Page 7 (P7).

By the above described method, the storage apparatus 30, even if an event such as a failure occurs in the logical resources, can maintain the performance requirements of the virtual volumes guaranteed to the host computer.

FIG. 5 is a block diagram showing the storage configuration of the memory 330 in the storage apparatus. In the memory 330, various types of programs read and performed by the processor 360 and various types of management tables related to the setting of Thin Provisioning, performing the same, furthermore, data migration among logical resources, and others are stored.

Figure 6:
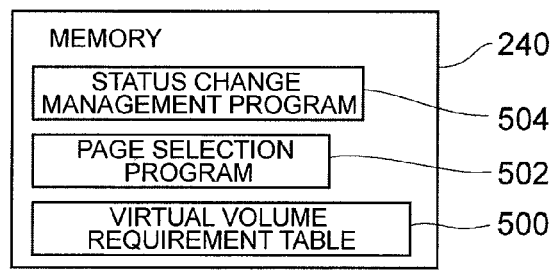
FIG. 6 is a block diagram of the memory in the management computer.

Furthermore, FIG. 6 is a block diagram of the memory 240 in the management computer 20. In the memory 240, similarly, various types of programs read and performed by the processor 230 and various types of management tables related to the management of the storage apparatus are stored.

The description is resumed from FIG. 5. The programs which the memory 330 comprises are a configuration management program 400, an event notification program 402, the event management program 404, the event impact range identification program 406, the page program 408, a pool configuration change program 410, and a dynamic page control program 412.

Furthermore, the information tables which the memory 330 comprises are the logical resource management table 414, a pool management table 416, the virtual volume configuration table 418, a logical resource event table 420, and a page access log table 422.

Among these, the logical resource management table 414 (FIG. 7) is a table for managing logical resources 204, comprises the IDs 600 of the logical resources 204, the IDs 602 of the pools 206 to which the logical resources are assigned, the capacity information 604 of the logical resources, the IDs 606 of the pages belonging to the logical resources, the starting addresses 608 of the pages (logical addresses) in the logical resources, the ending addresses 610 of the pages, the usage statuses 612 of the pages on whether the pages are assigned to the virtual volumes or not, the average access intervals (min) 614 of the IO to the pages, and the status 616 related to whether the logical sources are normal, recovering from the failure, blocked, or others, and furthermore, specifies the correspondence relationship among these respective pieces of information.

The pool management table 416 (FIG. 8) is a table for managing the correspondence relationship between the pools 206 and the logical resources 204, and comprises the pool IDs 700 and the IDs 702 of the logical resources belonging to the pools.

The virtual volume configuration table 418 (FIG. 9) is a table for managing the configuration of the virtual volumes, that is, the correspondence relationship between the virtual volumes and the logical resources, and comprises the identification information (LUN) 800 for the host computer 10 to access the virtual volumes 208, the IDs 802 of the pools assigned to the virtual volumes, the address information 804 of the virtual volumes, the IDs 808 of the pages assigned to the virtual volume addresses, and the IDs 806 of the logical resources to which these pages belong.

The logical resource performance table (FIG. 10) is for managing the performance of the logical resources, and includes the IO performance 900 and the reliability 902. The IO performance 904 is the number of IOs per unit of time within the range the storage apparatus 30 can process the accesses to the logical resources normally, and is determined by the specification of the storage device, the RAID level, and others.

The reliability is an index regarding the redundancy related to data protection, and is determined by the RAID level, the redundant configuration of the path, and others. The reliability is identified qualitatively, for example, as high, medium, low, and others, or may also be identified quantitatively by the RAID level and others. Furthermore, the IO performance may also be identified qualitatively.

The logical resource event table (FIG. 11) is a table for managing the events that occurred in the logical resources, comprises the IDs 1000 for managing the events and, for each event, manages the time of occurrence 1002 of the event, the ID 1004 of the logical resource where the event occurred, the event type 1006, the parameter types 1008 on which the event makes impacts, and the estimated time 1010 at which the event is recovered.

The event types are, for example, "performance deterioration due to the degenerate mode" which is the status where a failure occurs in a part of multiple physical devices configuring the RAID group, parity recalculation is performed, and the performance of the logical resources is deteriorated by the degenerate mode such as the decrease of the RAID level, "failure recovery" indicating recovery from a failure in the storage device, and "suspend due to failure" where, due to a failure in the path, the network, or others, the host computer cannot access the logical resources, and therefore, the logical resources are suspended.

The parameter impacted by the event is determined. For example, "performance deterioration due to the degenerate mode," as the controller 31 operates the logical resources in the degenerate mode, deteriorates the IO performance of the logical resources, which deteriorates the reliability.

By the event management program 404, the storage apparatus 30, by referring to the RAID level and the spec of the logical resources, can calculate and ascertain the estimated time of recovering the original performance of the logical resources. "Failure recovery" indicates that the logical resource recovered to the normal performance. Though the event management program 404, as for "suspend due to failure," classifies the estimated time of recovery as "Not determined yet," the management apparatus 20 may also set the estimated time of recovery.

Other events for logical resources include the increase of the access load on the logical resources and the expiration of durability life of the storage devices (SSDs and others).

The event management program 404 monitors the access frequency for the logical resources and, if the access frequency exceeds a specified threshold, determines the occurrence of the event which is the increase of the access load. Meanwhile, the event management program 404 monitors the cumulative number of accesses to the logical resources and, if the cumulative number exceeds a specified threshold, determines the event which is the expiration of durability life. Furthermore, another event is a failure in the storage device connected from the outside of the storage apparatus. Furthermore, [another event is that] the redundant configuration of the network or the path might suffers a failure.

As described above, events in this invention indicate the factors or the situations which impact the JO performance, the reliability or others of the storage control processing in certain ways. The storage apparatus, as well as determining an event as an event of the logical resources, may also determine [an event] as an event of the pool and the storage devices. The event notification program 402 updates the event management table each time [the program 402] determines an event.

Figure 12:
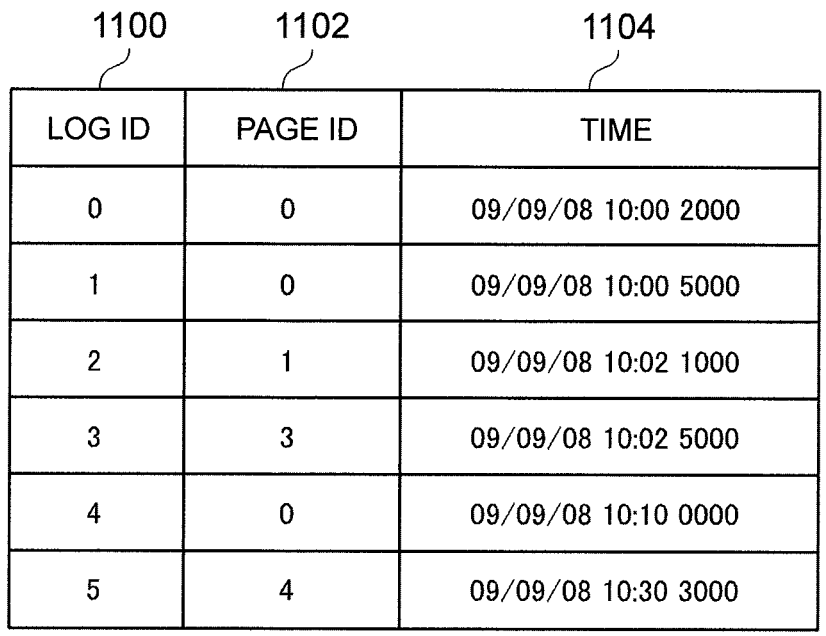
FIG. 12 is a page access log management table.

The page access log table (FIG. 12) is a table for recording logs of write or read access from the host computer 10 to the pages, comprises the log IDs 1100 and, for each log ID, manages the page ID 1102 and the access time 1104 of the access target page. The storage apparatus 30, each time the host computer accesses the pages, updates the log table. With reference to the page access log table, the configuration management program 400 (FIG. 5) which is described later ascertains the average access interval.

Note that, the management tables include a virtual volume requirement table 500 stored in the memory 240 of the management apparatus 20. Furthermore, the memory 240 comprises a status change management program 504 and a page selection program 502.

The virtual volume requirement table (FIG. 13) is for managing the requirements of the virtual volumes which the administrative user required of the storage apparatus 30, and the storage apparatus 30 intends to guarantee the characteristics specified in the virtual volume requirement table to the host computer which is the user of the virtual volumes.

The management device 30 refers to the virtual volume requirement table (FIG. 13) and the logical resource performance table (FIG. 11), selects the logical resource satisfying the performance requirement of the virtual volume, and assigns the same to the pool corresponding to the virtual volume. Therefore, if an event occurs in a logical resource, the performance of the logical resource is deteriorated and cannot satisfy the performance requirement of the virtual volume.

The virtual volume requirement table, for each virtual volume ID (LUN) 1200, manages the IO performance requirement 1202 which is required of the virtual volume and the reliability 1202 of data such as the RAID level.

The IOPS of the performance requirement is the number of IOs per unit of time (second) and, for example, 700<IOPS indicates a guarantee that the storage apparatus 30 can normally process 700 or more accesses to the virtual volume per unit of time.

Figure 13:
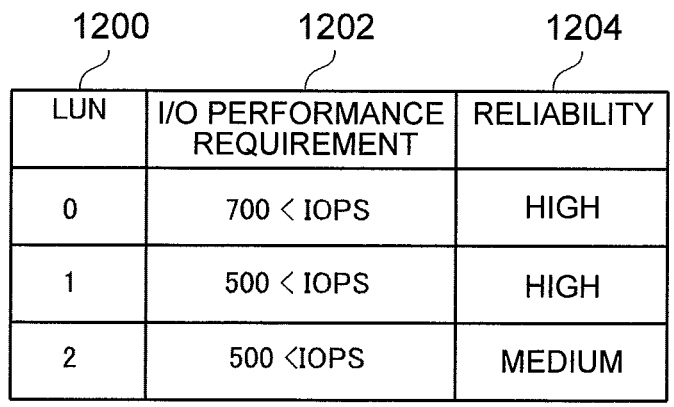
FIG. 13 is a virtual volume requirement table.

If the storage apparatus 30 assigns the logical resources to the virtual volumes, the index related to the performance of the logical resources (FIG. 10) must be equal to or larger than the performance index of the virtual volumes (FIG. 13). For example, a logical resource (FIG. 10, ID=2) should not be assigned to a virtual volume (FIG. 13, LUN=0).

Next, the details of the management programs belonging to the memory 350 in the storage apparatus 30 are described. The configuration management program 400 manages the configuration of the storage apparatus, acquires the information related to the configuration of the storage apparatus from the identified storage area, and registers the acquired information to the respective management tables. The information related to the configuration of the storage apparatus indicates the items except the "status" in FIG. 7, all the items in FIG. 8 and FIG. 9, and the item "logical resource ID" in FIG. 10. The event notification program 402 monitors the status of the logical resources and, if an event occurs in the logical resources, sets the ID (1000) in the logical resource event table (FIG. 11) in order of occurrence of the event and registers the time of event occurrence (1002) and the logical resource ID (1004) where the event occurred. Furthermore, the event notification program 402 sets the event type (1006) and the impacted parameter (1008) in the logical resource event table (FIG. 11).

Figure 14:
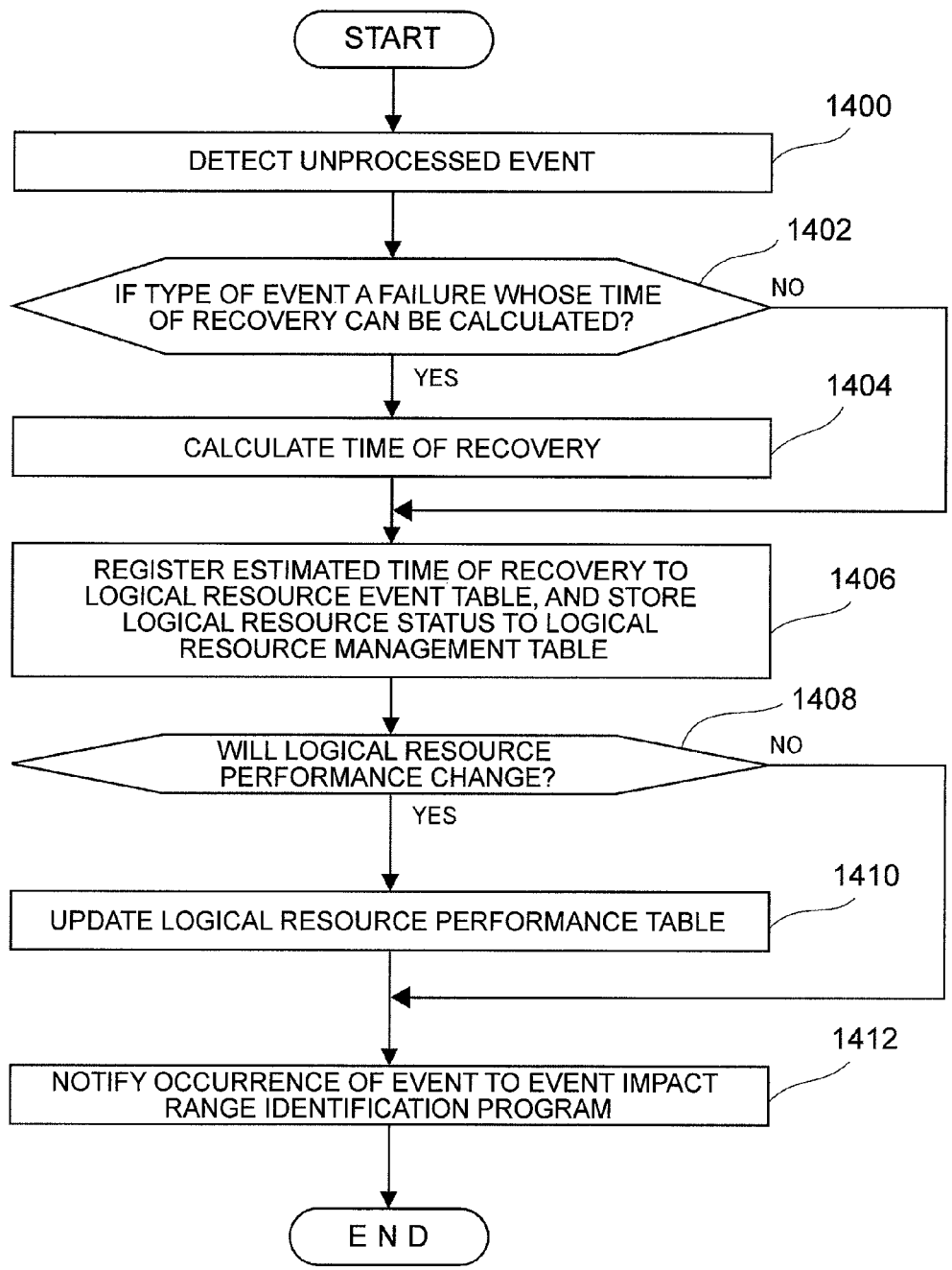
FIG. 14 is a flowchart showing the operation of an event management program.

The event management program manages unprocessed events with reference to the logical resource event table (FIG. 11) and, if detecting an unprocessed event as shown in FIG. 14 (1400), determines whether the type of this event is a failure whose time of recovery can be calculated or not (1402).

For example, the event type "performance deterioration due to the degenerate mode" (event ID in FIG. 11=1) is determined to be an event whose time of recovery can be calculated. Meanwhile, a failure due to the path or the network (event ID in FIG. 11=3) is determined to be an event whose time of recovery cannot be calculated. Note that the time of recovery is the useful information for determining the order of performing multiple types of processing for the controller 31 to solve the impact of the event.

Next, the event management program ascertains the time required for the logical resources to recover from the event (1404), ascertains the scheduled time of recovery with reference to the result of the ascertaining, and registers the same to the logical resource event table (FIG. 11).

Note that the time required for recovery is calculated by the characteristics of computer resources. The computational resources are parameters which make impacts on the time of recalculation when performing the parity recalculation, which are the RAID levels (4D+1P, 5D+1P, etc.) which are already described, the virtual volume size or the logical resource size, the I/O performance such as the disk rpm, the performance of the processor in the storage apparatus, and others.

Note that, in FIG. 11, a flag distinguishing whether the event recovery processing is completed or not may also be set.

Furthermore, the event management program, with reference to the event type, determines the status of the logical resources, for example, normal, recovering from the failure, blocked, or others, and registers the same to the logical resource management table (606 in FIG. 7) (1406). Furthermore, the event management program estimates the performance of the logical resource where the event occurred with reference to the event type 1006 and the impacted parameter 1008 of the logical resource event table (FIG. 11) and, if determining that the logical resource performance changes (1408), updates the changed performance to the logical resource performance table (FIG. 10) (1410).

For example, if an event ID 1 (FIG. 11) occurs, the event management program updates the logical resource performance table (FIG. 10) with the IO performance of the logical resource ID 0 "1000→800" and the reliability "high→low" while, if a failure occurs in the logical resource 0 once but if recovering from the failure (event ID 2) occurs, the event management program updates the logical resource performance table (FIG. 9) for returning the IO performance of the logical resource 0 "800→1000" and the reliability "low→high." Next, the event management program notifies the occurrence of the event to the event impact range identification program (1410).

Figure 15:
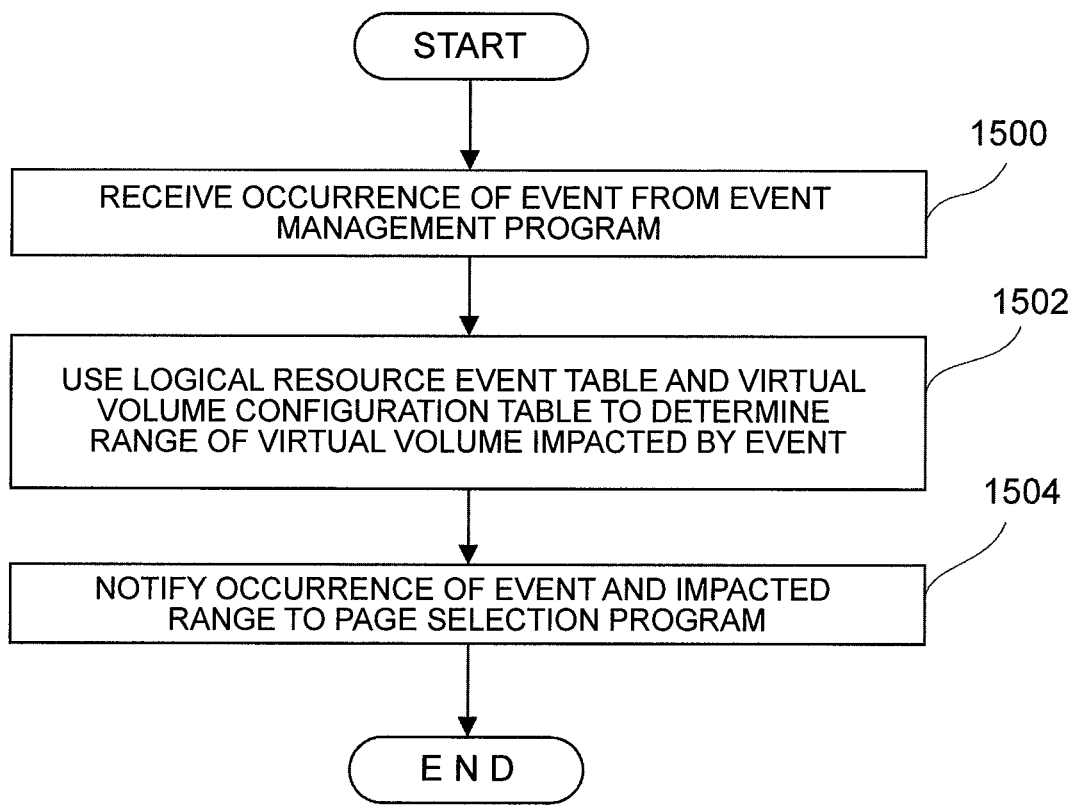
FIG. 15 is a flowchart showing the operation of an event impact range identification program.

The event impact range identification program identifies, as shown in FIG. 15, the range on which the event makes an impact and, if receiving the occurrence of the event from the event management program 404 (1500), refers to the logical resource event table (FIG. 11), seeks the logical resource ID 1004 with the event ID 1000 as a key, furthermore, with this logical resource ID as a key, refers to the virtual volume configuration table (FIG. 9), determines the virtual volume (LUN) to which the logical resource corresponds (1502), and notifies the result to the page selection program 502 in the management apparatus 20 via the network (1504). The page selection program 502 may also exist in the storage apparatus.

Figure 16:
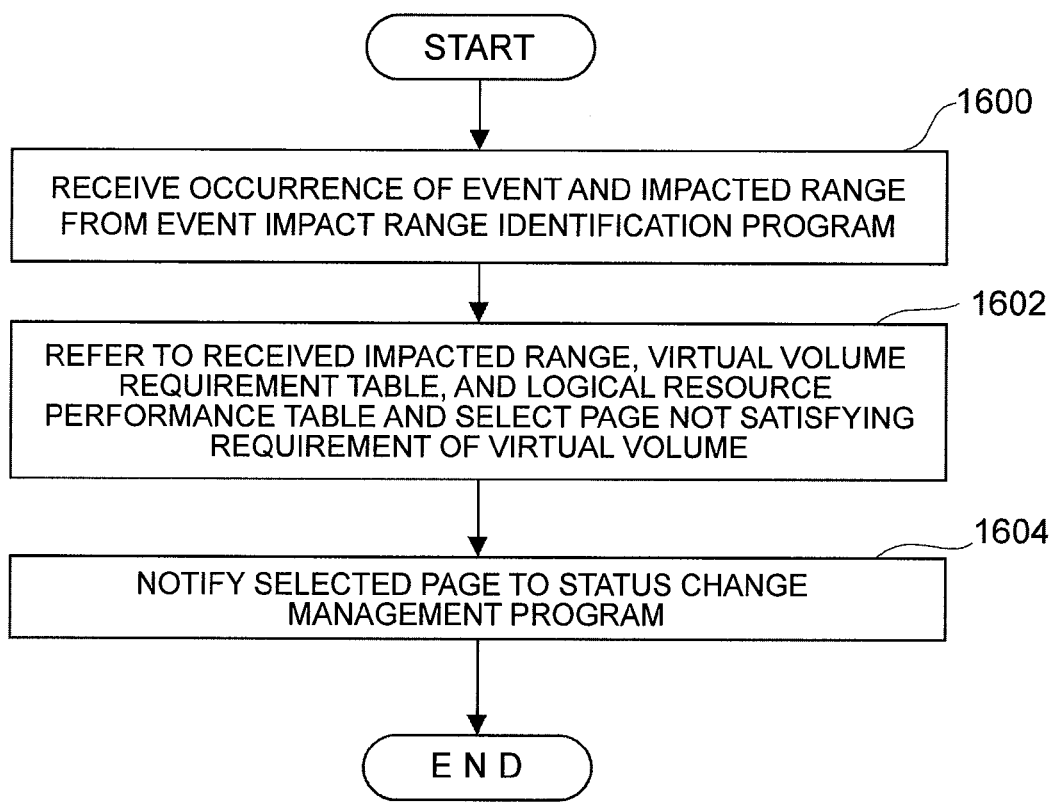
FIG. 16 is a flowchart showing the operation of a page selection program.

The page selection program selects, if the response performance of the virtual volume to the host computer is impacted by the above-mentioned event, the page which is the cause [of the event) and, if receiving the occurrence of the event and the impact range of the same (the virtual volumes on which the event makes an impact) from the event impact range identification program (1600) as shown in FIG. 16, refers to the virtual volume configuration table (FIG. 9) and the logical resource management table (FIG. 7), selects the page belonging to the logical volume where the event occurred among the pages assigned to the virtual volumes on which the event makes an impact (1602), and notifies the selected page to the status change management program (1604).

Figure 17:
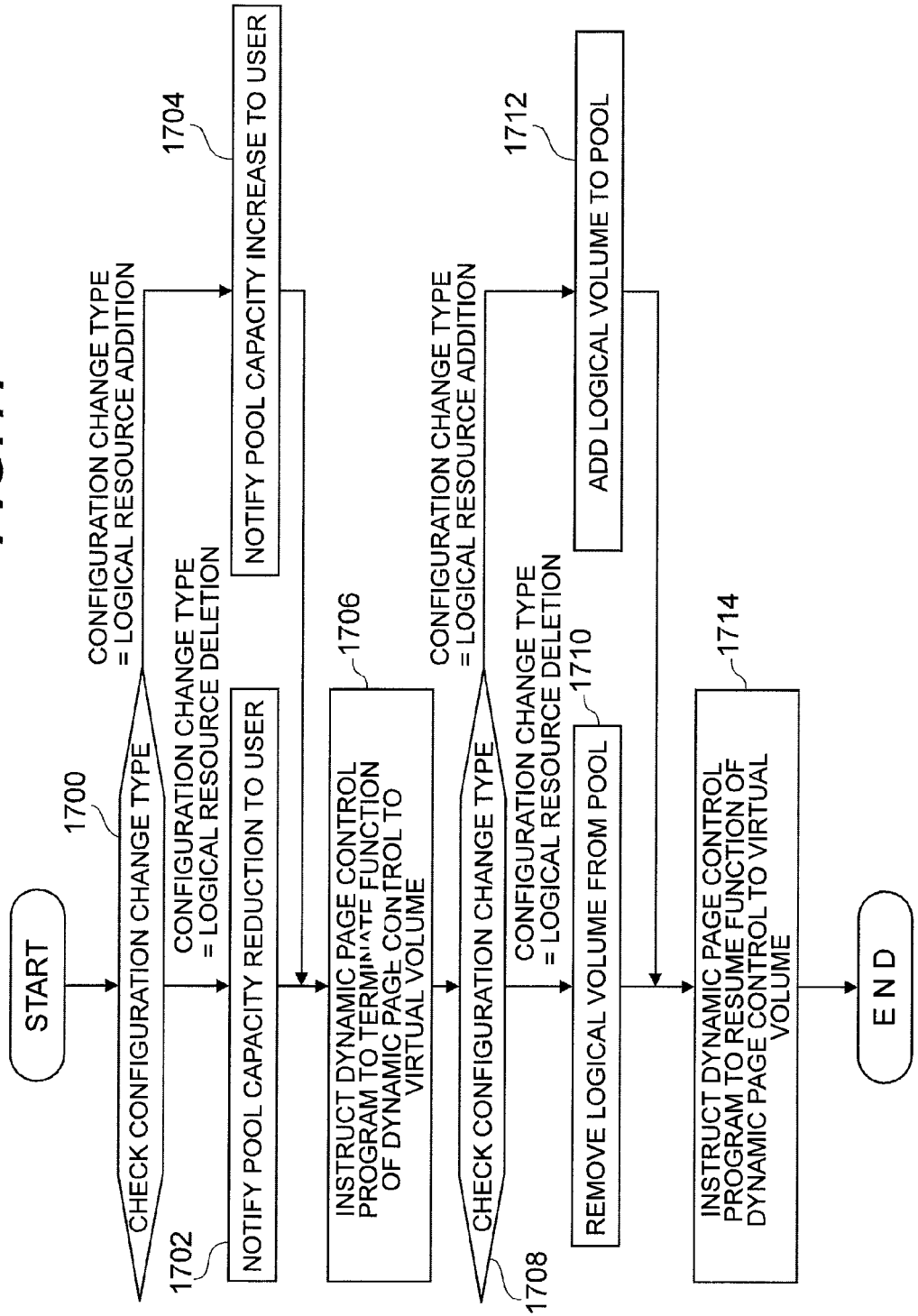
FIG. 17 is a flowchart showing the operation of a pool configuration change program.

Next, the pool configuration change program 410 performs, as shown in FIG. 17, if any virtual volume impacted by the above-mentioned event exists, the change of the pool configuration to ensure that no page is assigned to the relevant virtual volume from the logical resource where the event occurred.

The pool configuration change program 410 checks the configuration change type (1700) and, if the configuration change type is logical resource deletion, performs the notification to the administrative user of the storage apparatus 30 of reducing the capacity of the pool to which the logical resource where the event occurred belongs (1702). Meanwhile, if the configuration change type is logical resource addition, [the pool configuration change program 410] performs the notification to the administrative user of increasing the capacity of the pool (1704).

Next, the pool configuration change program instructs a dynamic page control program 412 (FIG. 4) to terminate the dynamic page assignment to the virtual volume to which the relevant pool corresponds (1706). The dynamic page control program is a program which performs the control for dynamically assigning pages to the virtual volumes from the logical resources.

Next, the pool configuration change program checks the configuration change type (1708) and, if the configuration change type is logical resource deletion, removes the entry of the logical resource where the event occurred from the pool management table (FIG. 8) (1710). For example, if a disk is damaged in the RAID 5 configuration and the reliability is deteriorated, for restoring the reliability, for the purpose of reconfiguring the virtual volume and the pool, [the pool configuration change program] removes the logical resource from the virtual volume configuration table and the pool configuration table.

Meanwhile, if the configuration change type is logical resource addition, [the pool configuration change program] adds logical volumes to the pool management table (1712). Subsequently, the pool configuration change program instructs the dynamic page control program to resume the dynamic page assignment to the virtual volumes (1714). The dynamic page control program refers to the updated pool management table and performs the dynamic page assignment to the virtual volumes.

Figure 18:
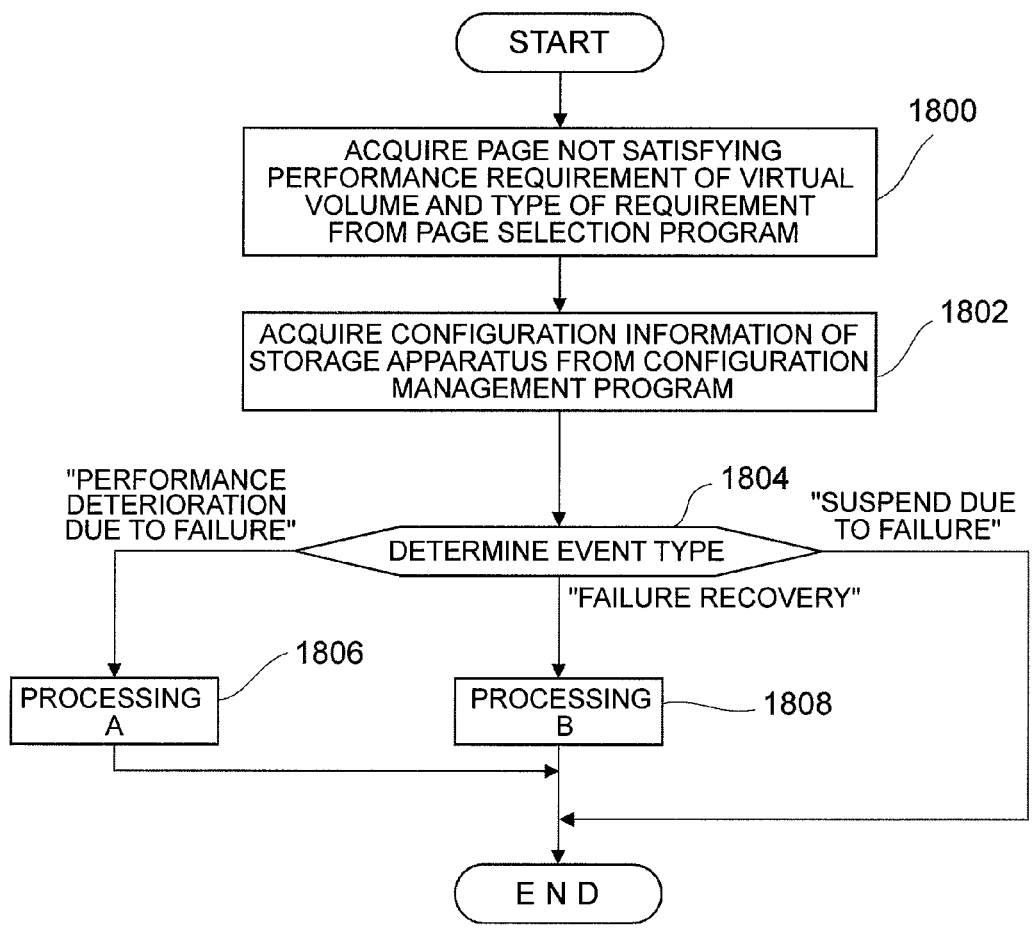
FIG. 18 is a flowchart showing the operation of a status change management program.

The status change management program 504 is, as shown in FIG. 18, a program for managing the page assignment to the virtual volumes from the logical resource where the event occurred, acquires from the page selection program the information related to the pages not satisfying the requirements set for the virtual volumes and the types of the impacted requirements among the virtual volume requirements (1800), furthermore, through the configuration management program, acquires the information related to the mutual correspondence relationship between the logical resources, pools and the virtual volumes (1802), refers to the logical resource event table (FIG. 11), and determines the event type for the logical resource where the event occurred (1804).

Note that the programs in the management computer may also be embedded in the storage apparatus or in the computer.

If the event type is "performance deterioration due to failure," the status change management program performs the processing A for the purpose of adjustment for the logical resources (1806) or, if the event type is "suspend due to failure," performs the processing B for the purpose of blocking the logical resource (1806).

Figure 19:
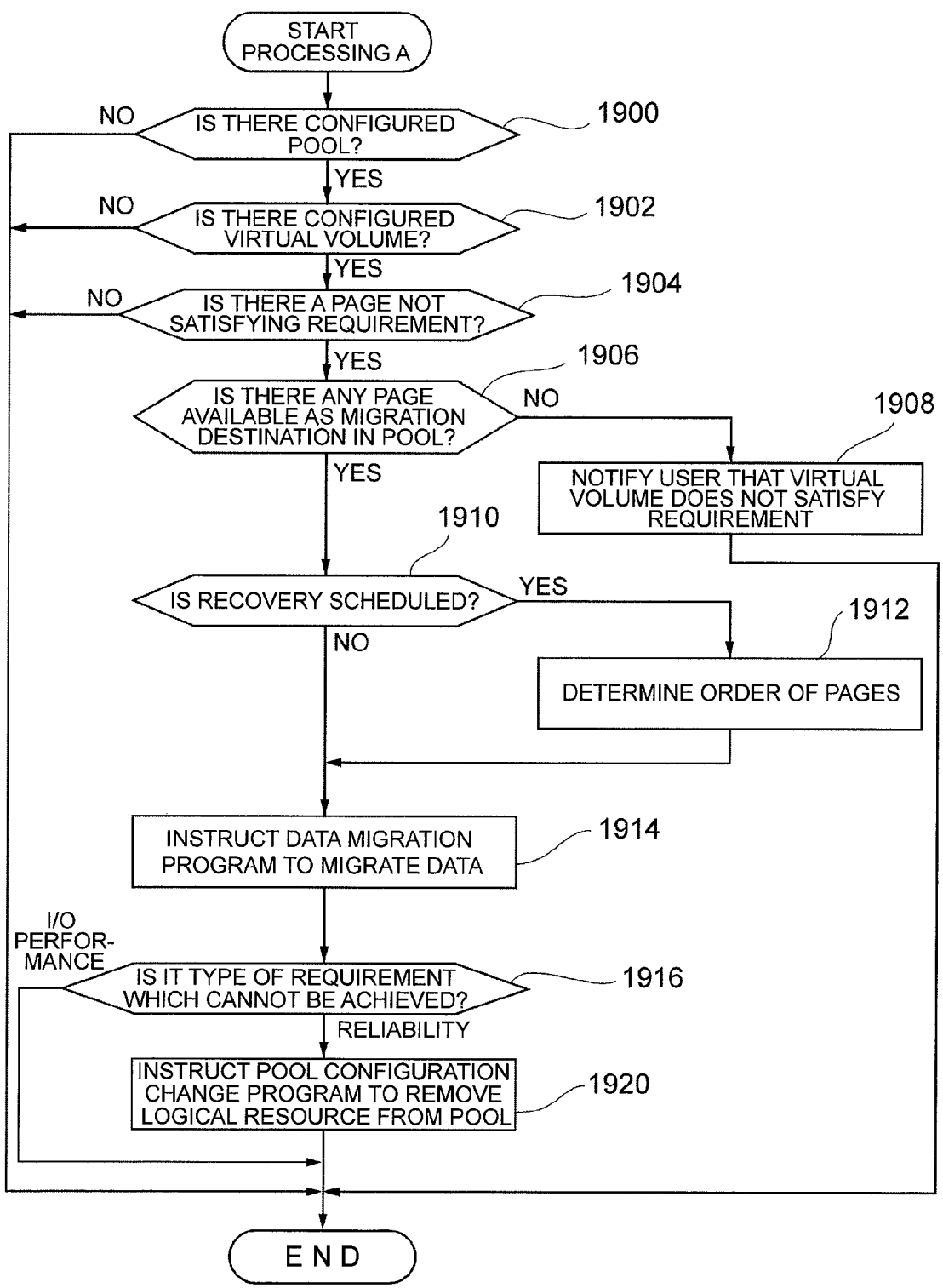
FIG. 19 is a flowchart describing part of the operation of the status change management program in detail.

Next, the details of the processing A are described with reference to FIG. 19. The status change program (504), with reference to the configuration information of the storage apparatus, determines whether a pool to which the logical resource where the event occurred belongs exists or not with reference to the pool management table (FIG. 7) and the pool management table (FIG. 8) (1900) and, if affirming this, determines whether a virtual volume assigned to the pool exists or not with reference to the virtual volume configuration table (FIG. 9) (1902).

Furthermore, the status change management program, with reference to the virtual volume configuration table (FIG. 9), determines whether, among the pages of the logical resource where the event occurred, any pages not satisfying the required performance of the virtual volume are assigned to this virtual volume or not (1904).

If affirming this, the status change program determines whether, in the pool to which the logical resource where the event occurred belongs, other logical resources comprising the pages capable of satisfying the required performance of the virtual volume exist or not (1906). In this type of logical resources, no event occurs, or recovery from the failure is performed even if any event occurs or, even if the performance is deteriorated due to the failure, the required performance of the virtual volume can be satisfied.

If negating this determination, the status change program notifies the user, such as the administrator and the host computer, that, if continuing the dynamic page assignment to the virtual volume using the logical resource where the event occurred, the required performance requirement cannot be satisfied for the virtual volume (1908).

Meanwhile, if any unused pages (not assigned to any virtual volume) exist in the appropriate logical resources, furthermore, [the status change program] determines whether the logical resource where the event occurred is scheduled to be recovered or not (1910). The status change program, if the event is, for example, the performance deterioration due to the degenerate mode or the increase of the access load, determines that [the logical resource is] scheduled to be recovered. Meanwhile, if the event is, for example, the failure in the network or the path or the expiration of durability life of the storage devices, [the status change program] determines that [the logical resource is] scheduled to be recovered if the schedule for the recovery is input by the administrative user.

If determining that the recovery is scheduled, the status change program performs the processing of determining the order, when migrating data from the multiple pages assigned from the logical resource where the event occurred to the virtual volume to the pages in the appropriate logical resource, with what page among the multiple pages the migration should be started (1912).

The status change program, for example, refers to the page access log table (FIG. 12), ascertains the access interval to the inappropriate pages, and compares this with the scheduled time of event recovery. As the point of the time of event occurrence with the average access interval added (estimated time of next access) is earlier than the scheduled time of failure recovery, the priority of performing data migration for the inappropriate pages is determined to be higher while the priority is determined to be lower as the former time is later than the latter. The status change program determines the order in accordance with the degrees of priority.

Next, the status change program instructs the data migration program to migrate data among pages in accordance with the order of pages if the order exists or without considering the order if the order of pages does not exist (1914).

Next, the status change program determines what type of performance requirement of the virtual volume cannot be achieved (1916) and, if the [relevant] performance requirement is the reliability, because the reliability of the virtual volumes cannot be sustained, the RAID level is deteriorated even though the logical resource is recovered from the failure, instructs the pool configuration change program to remove the logical resource where the event occurred from the pool corresponding to the virtual volume (1920). Note that the pool configuration change program may also newly assign the logical resource where the event occurred to the pool corresponding to another virtual volume. This case assumes that the logical resource can achieve the performance requirements of the other virtual volume.

Note that, if a logical resource is recovered from the failure in the path or the network, or if the storage device where the failure occurred is replaced by a normal storage device, the pool configuration change program (FIG. 17) may also include the logical resource which was once removed from the pool in the pool again.

Note that, if the administrative user who received the notification from the status change management program that the virtual volume performance requirement cannot be satisfied adds a new logical resource to the pool, the status change management program performs the step for determining whether the recovery is scheduled or not (1910).

Figure 20:
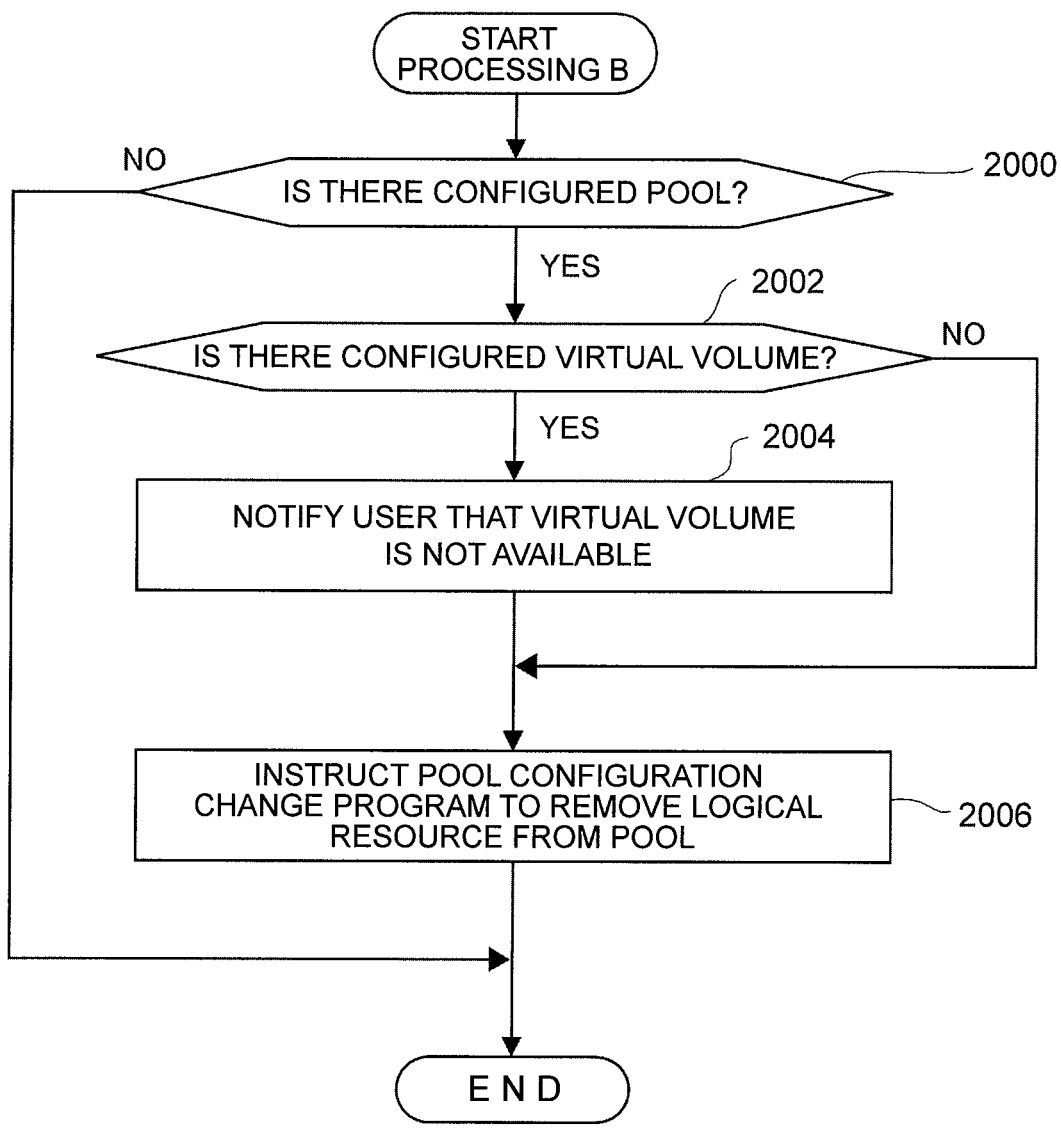
FIG. 20 is a flowchart describing part of the operation of the status change management program in further detail.

The status change management program, if determining the event of suspend due to the failure in the logical resource is (1804 in FIG. 18), performs the logical resource blocking processing (the processing for suspending the logical resource) in accordance with the processing B. In the processing B shown in FIG. 20, the first two steps of processing 2000, 2002 are the same as in the processing A (FIG. 19).

Figure 8:
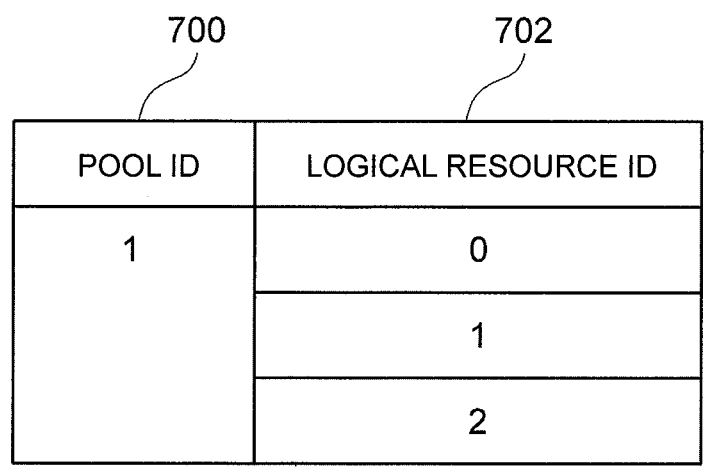
FIG. 8 is a pool management table.

The status change management program, if determining that a virtual volume corresponding to the logical resource where the event occurred exists, notifies the user that the logical resource where the event occurred cannot dynamically assign the pages to the virtual volumes (2004), and then instructs the pool configuration change program to remove the logical resource where the event occurred from the pool (2006) (FIG. 17). The status change management program deletes the ID of the logical resource in the pool management table (FIG. 8).

Then, the status change management program, if determining the event of recovery from the failure (1804 in FIG. 18), performs the logical resource recovery processing as needed. For example, the status change management program, though the logical resource was removed from the pool by the processing A or the processing B, performs the processing such as reassigning the recovered logical resource to the original pool, newly assigning the same to another pool, migrating data from the migration destination page to the page in the recovered logical resource, or others.

Figure 21:
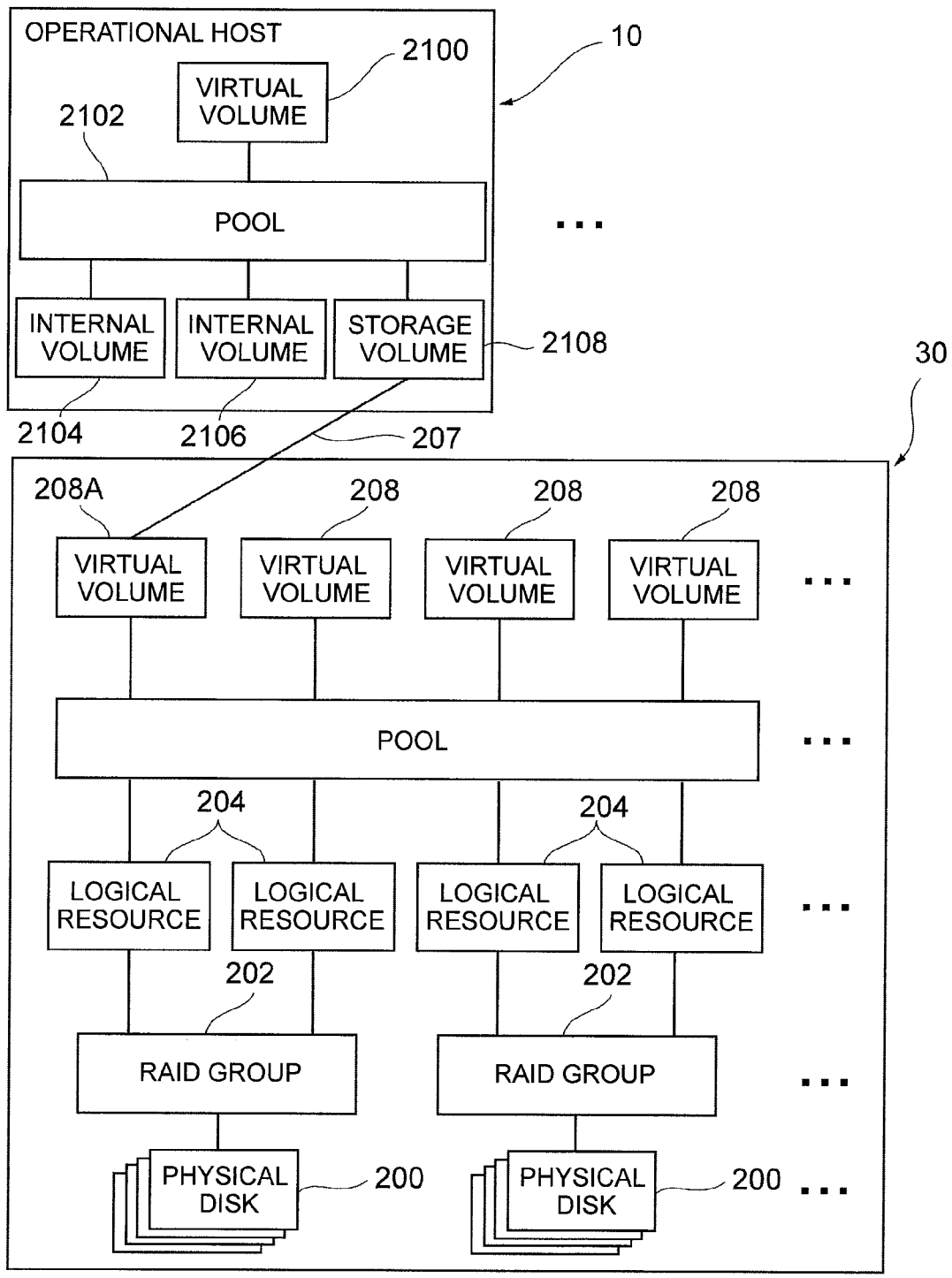
FIG. 21 is a function block diagram of the computer system related to another embodiment of this invention.

Next, the function block of another embodiment of this invention is shown in FIG. 21. FIG. 21 shows a variation of FIG. 2, and the host computer 10 comprises a virtual volume 2100 to access by itself, a pool 2102 made to correspond to the virtual volume, internal volumes 2104 and 2106 assigned to the pool, and a storage volume 2108, which is the characteristic of the embodiment related to FIG. 21. The internal volumes 2104 and 2106 are provided by the storage devices which the host computer comprises and assign storage areas to the virtual volume 2100 via the pool 2102.

The storage volume 2108 is a volume corresponding to the virtual volume 2108 in the storage apparatus 30, whose storage capacity is the virtualized capacity of the virtual volume 208 connected via a path 207. The storage volume 2108 itself does not comprise any storage areas, and the storage areas assigned from logical resources 204 to the virtual volume 208A via the pool in the storage apparatus become the storage areas of the storage volume 2108.

Each time the host computer accesses the own internal volume 2100, real storage areas are assigned from the internal volumes 2104, 2106 or the storage volume 2108 to the internal volume 2100.

According to this embodiment, the storage apparatus 30 can dynamically assign storage areas of the storage apparatus 30 to the virtual volume of the host computer 10.

FIG. 23 is a logical resource management table for managing the correspondence relationship among the storage areas in the host computer 10, and is stored in the memory 140 of the host computer 10. The logical resources IDs are for identifying the internal volumes or the storage volume in the host computer 10, the assignment pool IDs are for identifying the pools in the host computer 10, the storage LUNs are for identifying storage apparatuses to which the host computer is connected, the capacity is the capacity of the pools, the page IDs are the IDs of the pages belonging to the logical resources, the starting addresses are the head addresses in the logical resources of the pages, and the ending addresses are the final addresses in the logical resources of the pages. The usage statuses show whether the pages are assigned to the virtual volumes 2100 or not, the average access intervals are for the accesses from the CPU 130 to the pages, and the statuses are the logical resource statuses of the respective pages.

In FIG. 23, since the logical resource (ID=0) is the internal volumes (2104, 2106) in the host computer 10, "null" is set for the storage LUN. The logical resource (ID=1) is the storage volume (2108) connected to the storage apparatus (LUN=0).

FIG. 24 is a pool management table showing the correspondence relationship between the pool 2102 and the logical resources (2104, 2106, 2108) in the host computer 10.

FIG. 25 is a virtual volume configuration table for managing the configuration of the virtual volume 2102 in the host computer 10, comprises the virtual volume (LUN), the pool 2102, the address areas of the virtual volume, the IDs of the logical resources assigned to the respective address ranges of the virtual volume, and the IDs of the pages in the logical resources, and shows the correspondence relationship of these items.

Figure 22:
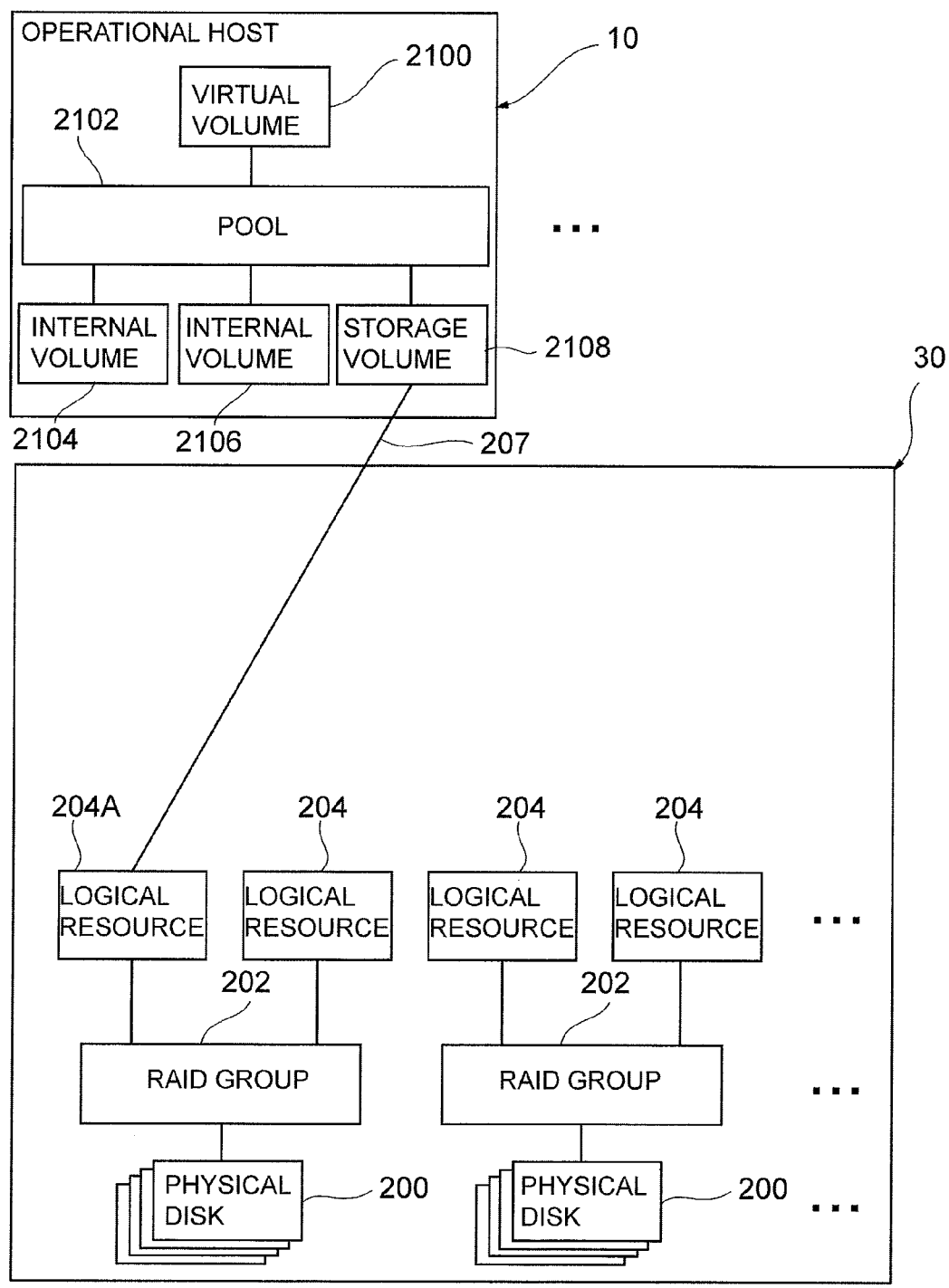
FIG. 22 is a function block diagram related to a variation example of FIG. 21.

FIG. 22 is a function block diagram related to a further variation example of FIG. 21. The embodiment related to FIG. 22 is different from the embodiment in FIG. 21 in that the storage volume 2108 is directly assigned to the logical resource 204 of the storage 30, not via the virtual volume 208. According to the embodiment shown in FIG. 22, even in the virtual volume configuration in the host (capacity virtualization configuration), the impact range can be identified by the same algorithm as in the above-mentioned embodiment, whose result can be notified to the operational host.

While the logical resource IDs can be made unique regardless of storage IDs in the above-mentioned embodiment, these may also be made unique only to the storage IDs.

If the event impact range identification program (FIG. 15) identifies the range of a positive impact, for example, if [the program] identifies the event of failure recovery for a logical resource, it may also be used to migrate the pages from the existing logical resource to the recovered logical resource and balance the number of pages among multiple logical resources.

The invention claimed is:

1. A computer system comprising a storage apparatus that allocates a real storage area from a plurality of real storage areas of a plurality of storage devices according to an access from a host computer, the storage apparatus comprising:
a virtual logical area having a plurality of virtual volumes to be provided to the host computer;
a plurality of real logical areas including the real storage areas,
a controller for controlling the allocation of the real storage area from the real logical areas to the virtual logical area; and
at least one pool comprised of the plurality of real logical areas,
wherein the controller assigns the pool to the virtual volumes, and the controller assigns pages to the virtual volumes from the real logical areas, wherein the controller:
detects an event that occurs in one of the real logical areas;
controls the allocation of the real storage areas from the real logical areas to the virtual logical area based on the event,
stops assignment of pages to the virtual volumes from the real logical area where the event occurred,
removes the real logical area from the corresponding pool, if the controller determines that the real logical area where the event occurred needs to be removed;
adds another real logical area to the corresponding pool, if the controller determines another real logical area should be added to the corresponding pool;
wherein the controller further:
allocates real storage areas from the real logical areas to an impact range of the virtual volume;
seeks a scheduled time of recovery from the event and an access interval from the host computer to each of the plurality of real storage areas;
decides a priority for migrating the data to the other real logical areas between the plurality of real storage areas based on the scheduled time of recovery and the access interval, and migrates the data from the real storage areas to the other real logical areas based on the priority;
wherein if the type of the event is operation of the real logical area according to a degenerate mode based on the occurrence of a failure in at least one of the storage devices configuring the real logical area subject to the event, compares a first performance of the real logical area subject to the event and a second performance of the virtual logical area;
wherein if the first performance falls below the second performance, migrates data of the real storage area that was allocated to the virtual logical area within the real logical area subject to the event to another of the real logical areas with a performance that is higher than the performance of the virtual logical area;
wherein if the type of the event is operation of stopping the real logical area, excludes the real logical area from allocating the real storage areas thereof to the virtual logical area.

2. The computer system according to claim 1,
wherein the controller:
compares a first performance of the real logical area after the occurrence of the event and a second performance set in the virtual logical area; and
controls the allocation of the real storage area from the real logical area to the virtual logical area based on the comparative result.

3. The computer system according to claim 2,
wherein the controller:
determines the impact range within the virtual logical area according to the event; and
migrates data stored in the real storage area which was allocated from a real logical area in which the event occurred in the impact range from the real logical area subject to the event to a real storage area of another real logical area with a performance that is higher than the performance of the virtual logical area, and allocates the real storage area to the impact range of the virtual logical area.

4. The computer system according to claim 2,
wherein the controller:
operates the real logical area in the degenerate mode if a failure occurs in at least one among the storage devices configuring the real logical area;
detects the degenerate mode as the event;
compares the first performance based on an I/O performance and/or reliability of the real logical area subject to the event, and the second performance based on an I/O performance and/or reliability of the virtual logical area; and
if the first performance falls below the second performance, controls the allocation of the real storage areas from the real logical areas to the virtual logical area.

5. The computer system according to claim 3,
wherein the controller:
allocates a plurality of the real storage areas from the real logical area to an impact range of the virtual volume;
if the event occurs in the real logical area, seeks a scheduled time of recovery from the event and an access interval from the host computer to each of the plurality of real storage areas; and
decides a priority for migrating the data to the other real logical area between the plurality of real storage areas based on the scheduled time of recovery and the access interval, and migrates the data from the real storage area to the other logical area based on the priority.

6. The computer system according to claim 5,
wherein the controller estimates a scheduled time of subsequent access based on the access interval, and sets the priority higher as the scheduled time of subsequent access is earlier than the scheduled time of recovery.

7. The computer system according to claim 2,
wherein the controller:
determines a type of the event;
if the type of the event is the operation of the real logical area according to the degenerate mode based on the occurrence of a failure in at least one among a plurality of storage devices configuring the real logical area, compares the first performance of the real logical area subject to the event and the second performance of the virtual logical area;
if it determines that the first performance falls below the second performance, migrates data of the real storage area that was allocated to the virtual logical area within the real logical area subject to the event to another real logical area with a performance that is higher than the performance of the virtual logical area; and
if the type of the event is the operation of stopping the real logical area, excludes the real logical area from a group to allocate the real storage area to the virtual logical area.

8. The computer system according to claim 1,
wherein the controller:
selects a virtual logical area to which the real logical area subject to the event is allocated among the plurality of virtual logical areas;
selects the real storage area allocated to the selected virtual logical area within the real logical area; and
migrates data of the selected real storage area to another real logical area with a performance that is higher than a performance of the virtual logical area, and allocates an area for storing the data of the other real logical area to the virtual logical area.

9. The computer system according to claim 1,
wherein the controller:
compares a performance of the real logical area after the occurrence of the event, and a performance set in the virtual logical area; and
if it determines that the performance of the real logical area subject to the event falls below the performance set in the virtual logical area, excludes the real logical area from a group to allocate the real storage area to the virtual logical area.

10. The computer system according to claim 1,
wherein the controller:
determines a status of a recovery schedule of an event; and
controls the allocation of the real storage area from the real logical area to the virtual logical area based on the determination result.

11. The computer system according to claim 1,
wherein the host computer comprises:
a host virtual area for user access and in which a storage capacity is virtualized; and
a host logical area that is logically connected to the host virtual area and a storage area of the storage apparatus.

12. The computer system according to claim 11,
wherein the storage area of the storage apparatus is the virtual logical area.

13. A method of sequentially allocating a real storage area from a plurality of real storage areas of a plurality of storage devices from a storage apparatus according to an access from a host computer in a computer system,
where the storage apparatus comprises a virtual logical area, which has a plurality of virtual volumes, in which a storage capacity is virtualized, a plurality of real logical areas including the real storage areas, a controller for controlling the allocation of the real storage area from the real logical areas to the virtual logical area, and at least one pool comprised of the plurality of real logical areas,
where the pool is assigned to the virtual volumes, and the controller assigns pages to the virtual volumes from the real logical areas, the method comprising:
detecting an event that occurs in the real logical areas;
determining a type of the event;
controlling the allocation of the real storage areas from the real logical areas to the virtual logical area based on the event;
stopping assignment of pages to the virtual volumes from the real logical area in which the event occurred;
removing the real logical area from the corresponding pool, if the real logical area where the event occurred needs to be removed;
adding another real logical area to the corresponding pool, if another real logical area should be added to the corresponding pool;
allocating real storage areas from the real logical areas to an impact range of the virtual volume;
seeking a scheduled time of recovery from the event and an access interval from the host computer to each of the plurality of real storage areas; and
deciding a priority for migrating the data to the other real logical areas between the plurality of real storage areas based on the scheduled time of recovery and the access interval, and migrating the data from the real storage areas to the other real logical areas based on the priority,
wherein if the type of the event is operation of the real logical area according to a degenerate mode based on the occurrence of a failure in at least one among a plurality of storage devices configuring the real logical area, comparing a first performance of the real logical area subject to the event and a second performance of the virtual logical area,
wherein if the first performance falls below the second performance, migrating data of the real storage area that was allocated to the virtual logical area within the real logical area subject to the event to another real logical area with a performance that is higher than the performance of the virtual logical area, and
wherein if the type of the event is operation of stopping the real logical area, excluding the real logical area from allocating the real storage areas thereof to the virtual logical area.

* * * * *